July 23, 1929.  J. T. LITTLETON, JR., ET AL  1,722,010
METHOD OF AND APPARATUS FOR PERFORATING GLASS
Filed March 2, 1925  6 Sheets-Sheet 1

INVENTORS
Jesse T. Littleton, Jr. and
Carlton R. Smith.
BY
ATTORNEY

July 23, 1929.  J. T. LITTLETON, JR., ET AL  1,722,010
METHOD OF AND APPARATUS FOR PERFORATING GLASS
Filed March 2, 1925  6 Sheets-Sheet 4

INVENTORS
Jesse T. Littleton, Jr. and
Carlton R. Smith.
ATTORNEY

July 23, 1929.  J. T. LITTLETON, JR., ET AL  1,722,010
METHOD OF AND APPARATUS FOR PERFORATING GLASS
Filed March 2, 1925  6 Sheets-Sheet 5

INVENTORS
Jesse T. Littleton, Jr. and
Carlton R. Smith.
BY
ATTORNEY

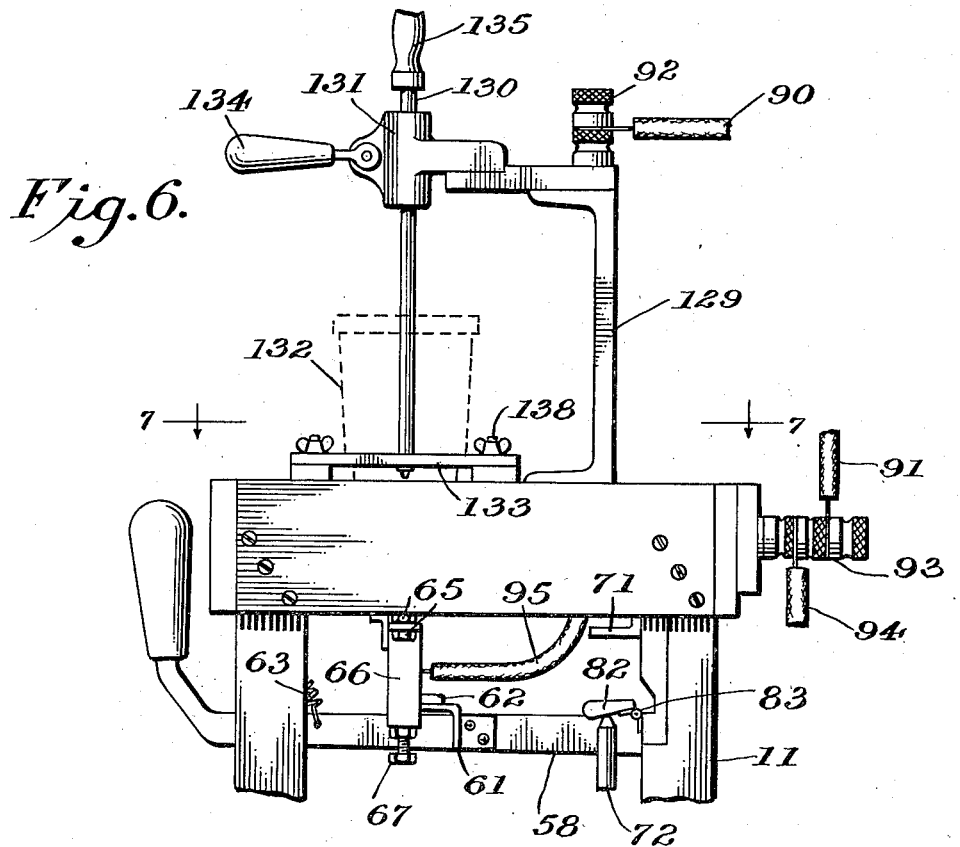
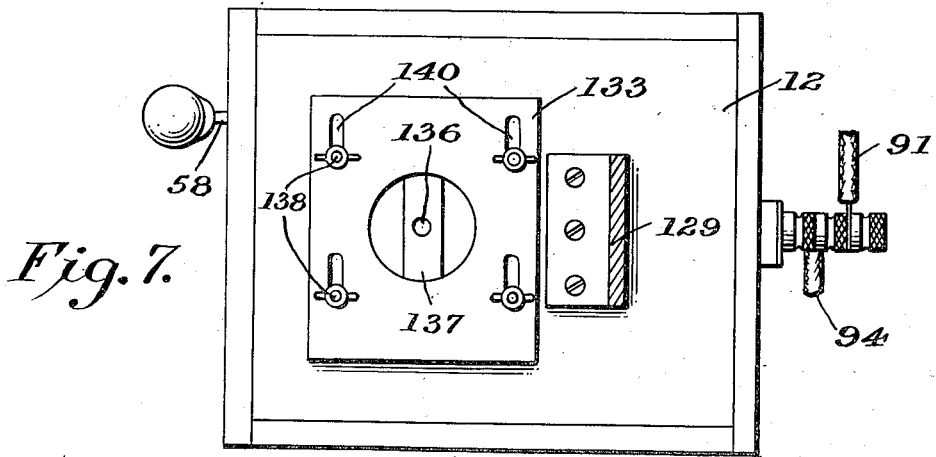

Patented July 23, 1929.

1,722,010

UNITED STATES PATENT OFFICE.

JESSE T. LITTLETON, JR., AND CARLTON R. SMITH, OF CORNING, NEW YORK, ASSIGNORS TO CORNING GLASS WORKS OF CORNING, NEW YORK, A CORPORATION OF NEW YORK.

METHOD OF AND APPARATUS FOR PERFORATING GLASS.

Application filed March 2, 1925. Serial No. 12,570.

This invention relates to the glass art, and more particularly to an improved method of and apparatus for perforating glass.

It is an object of the present invention to provide a cheap, simple and efficient method of perforating glass which will be useful for a wide range of purposes, as examples of which we will mention the reception of bushings, fastening means, binding posts and other electrical connections, and the formation of perforated strainer plates, spectacle blanks, dental shields, dome lights and other articles.

It is another object of this invention to effect the perforating operation without breaking, chipping, weakening or thickening the surrounding glass.

It is a further object to provide an efficient apparatus for carrying out our method of perforating glass.

With the above and other objects in view, which will be apparent as the description proceeds, we have disclosed our invention in the following specification taken in connection with the accompanying drawings, in which:

Figs. 6 and 7 are views of a further modification, Fig. 6 being a side elevation, and Fig. 7 a horizontal section on the line 7—7 of Fig. 6.

Figure 1:
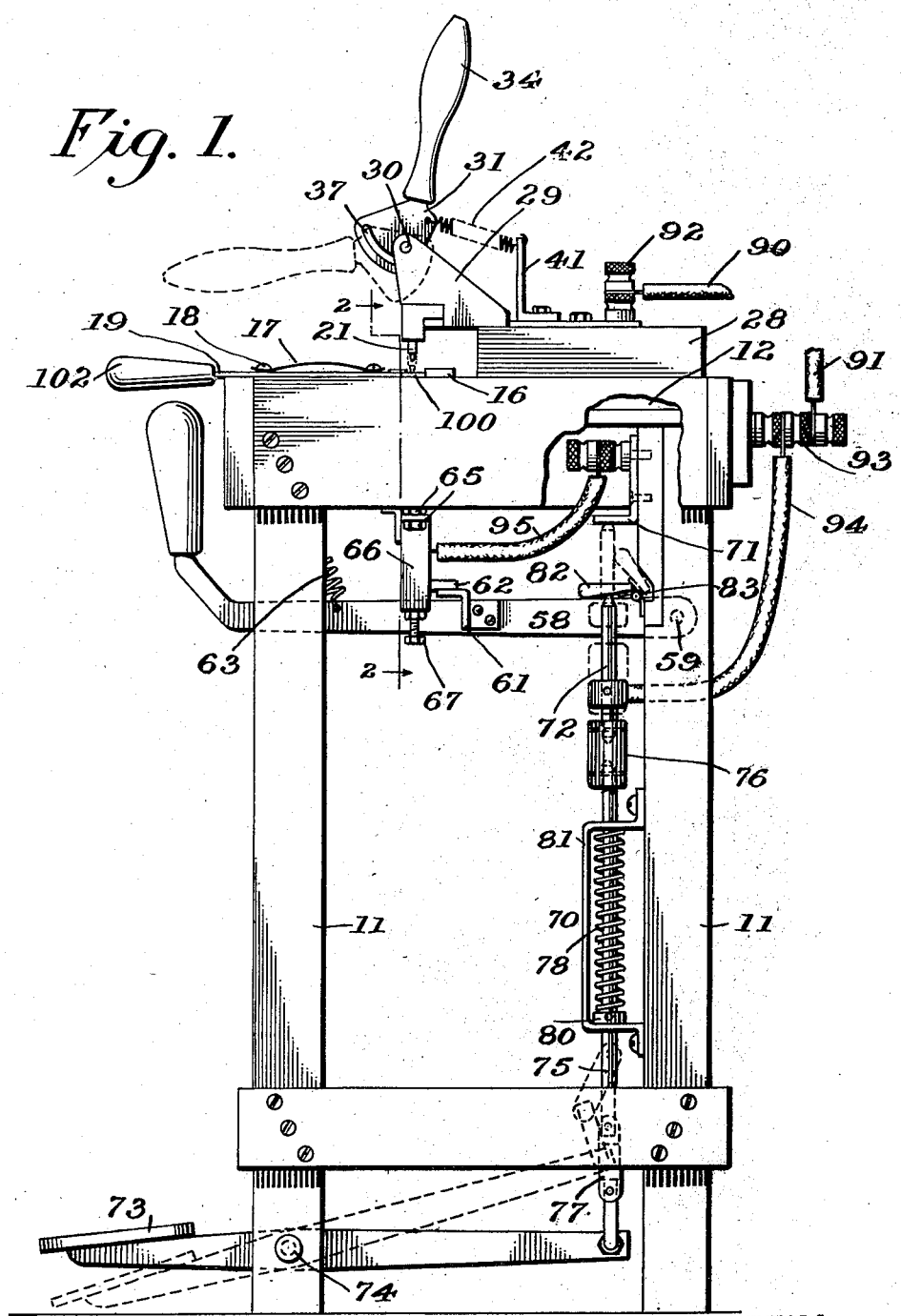
Fig. 1 is a side elevation of one embodiment of the invention with a portion of the framework broken away.
Figure 2:
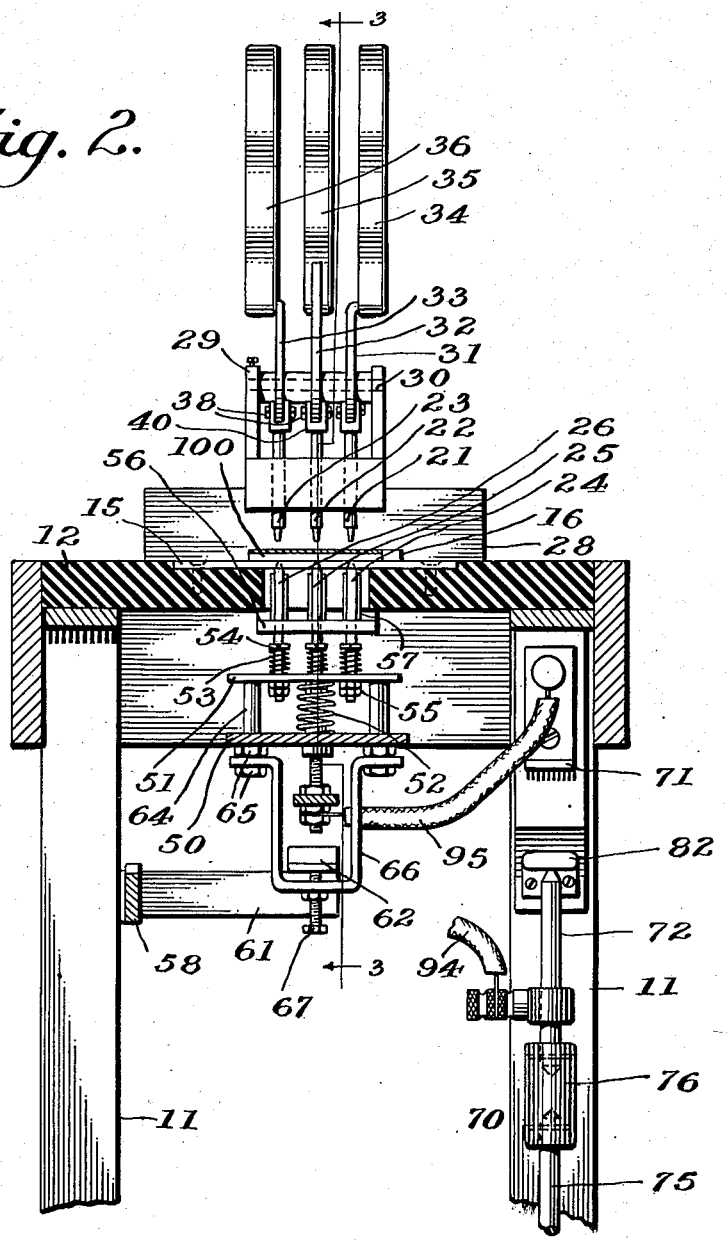
Fig. 2 is a vertical transverse section on the line 2—2 of Figs. 1 and 3.
Figure 3:
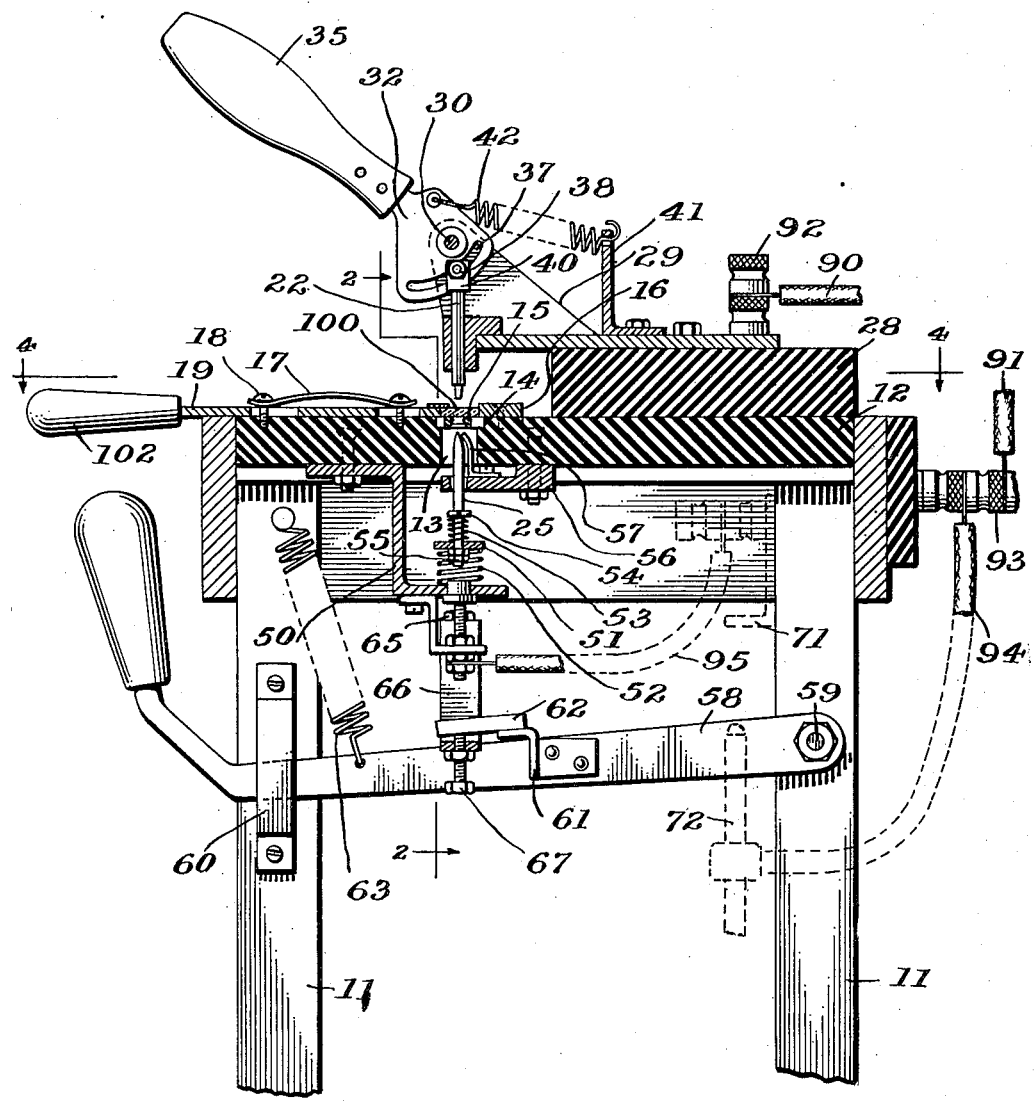
Fig. 3 is a vertical longitudinal section on the line 3—3 of Fig. 2.
Figure 4:
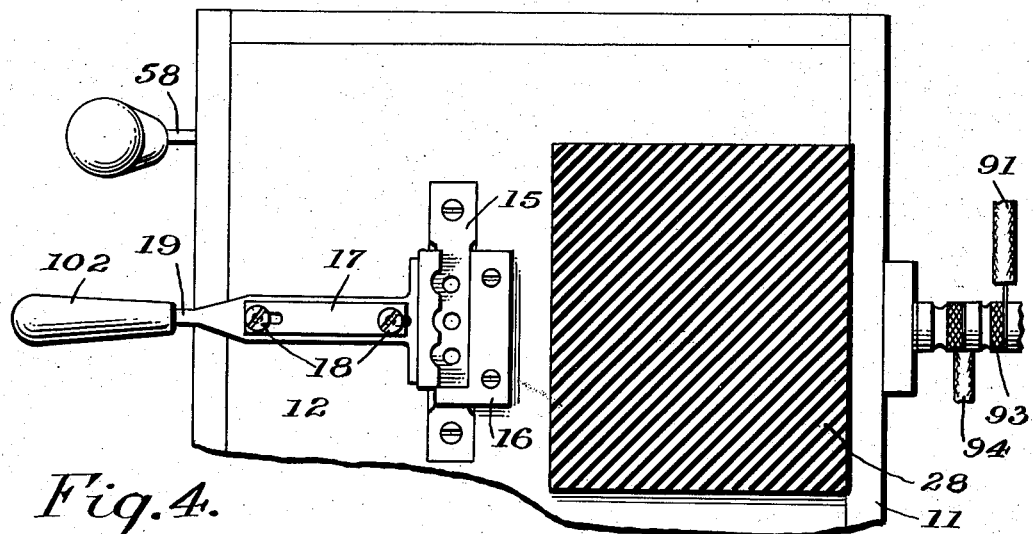
Fig. 4 is a horizontal section on the line 4—4 of Fig. 3.

Stated briefly, our invention consists in pre-heating a piece of glass, of any desired shape, to at least the temperature necessary to render it a conductor of electricity, and placing it on a suitable table between two movable electrodes which are directly opposite one another. One electrode already being in contact with the glass, the other electrode is moved until it contacts therewith. The circuit is then completed by closing a suitable switch, and the heat generated by the resistance which the glass offers to the passage of the current, in addition to the heat already present in the glass, melts the latter, whereupon one of the electrodes is pushed through the glass to form the desired perforation. This electrode is then raised clear of the glass, thus completing the operation.

Referring to the accompanying drawings, and particularly to Figs. 1–4 thereof, we have disclosed an apparatus which is particularly adapted for providing a flat piece of glass with from one to three perforations in a straight line, without the necessity of moving the glass, but it will be readily apparent that a larger number of perforations can be formed by increasing the number of electrodes, and that the latter can be arranged in other than a straight line if desired.

In these figs., 11 designates a framework of wood or metal provided with a suitable top or table 12 of any desired insulating material, for example transits. The table has a suitable opening 13 provided with a countersunk portion 14, in which is placed a die 15 provided with holes corresponding to the desired arrangement of the perforations in the glass. Adjacent to the opening 13 is mounted a stop 16 which is preferably made adjustable to facilitate lining up the desired location of the perforations with the electrodes. A spring 17 is secured to table 12, by bolts 18, to guide a holder 19 hereinafter referred to.

In this embodiment of our invention we have disclosed six electrodes, arranged in pairs, the electrodes 21, 22 and 23 being mounted above the table in vertical alinement with electrodes 24, 25 and 26, respectively.

Electrodes 21, 22, and 23 are mounted in a suitable framework which consists of a spacing block 28 and a yoke 29 secured thereto. A bolt 30, passing through the ears of the yoke, serves to support three cam shaped members, 31, 32 and 33, provided with handles 34, 35 and 36 of wood or any other suitable non-conducting material. Each of these cam shaped members is provided with a cam slot 37 which is adapted to guide a supporting bolt 38 that passes through the ears of suitable yokes 40, one of which is attached to each of the electrodes 21, 22 and 23. In order that the handles may be normally held in vertical position, each of these is connected to a suitable stop 41 by means of a tension spring 42. The shape of the cam slots 37 is such that when the handles 34, 35 and 36 are pulled forwardly the electrodes 21, 22 and 23 are lowered.

The lower electrodes 24, 25 and 26 are preferably yieldingly mounted on an angle bar 50 attached to the underside of table 12. The yielding connection consists in mounting the electrodes 24, 25 and 26 in a cross bar 51 which is normally supported above the angle bar by a spring 52, but which is lowered when the spring is compressed as hereinafter described. In order that the individual electrodes may have a yielding action, to prevent breakage, they are resiliently secured to the cross bar 51 by means of suitable springs 53 sleeved on the electrodes and adapted to bear against collars 54 pinned thereto, the electrodes being held in engagement with the cross bar 51 by suitable nuts 55. A guide 56, which is secured to the underside of table 12, is provided with suitable openings through which the electrodes are free to pass and with a suitable scraper 57 which is mounted in the path of the lower electrodes to remove any glass which may adhere thereto and which would act as an insulator on the contact.

In order that the electrodes 24, 25 and 26 may be lowered from their normally elevated position just below the glass to be perforated, to permit the descent of the upper electrodes and to remove any glass which may have adhered thereto, a hand operated lever 58 is pivoted to framework 11 at 59, the forward end of the lever operating in a suitable guide 60 also supported on the framework. The lever is provided with a bracket 61, carrying a block of insulating material 62 which is preferably fiber, and with a spring 63 attached to the framework normally hold the lever in elevated position. In order that the movement of the lever 58 may be transmitted to the electrodes, to lower them when desired, the cross bar 51 is provided with a pair of guide rods 64 which project downwardly through the angle bar 50 but are prevented from passing out of engagement therewith by suitable nuts 65. The latter also connect a U-shaped hanger 66 to the guide rods 64, this hanger being provided with a suitable set screw 67 which constitutes an adjustable contact between the hanger 66 and the block of insulating material 62 carried by lever 58.

In order to complete the circuit we provide a switch mechanism 70 which consists of a fixed contact member 71, secured to the framework 11, and a movable contact 72. The latter is operated by means of a treadle 73, pivoted to the framework 11 at 74, and carries a vertically movable rod 75 which actuates the movable contact 72 through a suitable insulating block 76, preferably of fiber. Any suitable yielding mechanism, such as a toggle 77, may be interposed in the connection, and a suitable spring 78, sleeved on the rod 75, operates between a collar 80 pinned to the rod and any suitable guide 81, secured to the framework, the guide also serving to insure a vertical alinement of the rod 75. The spring 78 normally holds rod 75 lowered, and a block 82, preferably of fiber insulating material, is pivoted to the frame at 83 in such a way that it drops by gravity onto the end of movable contact 72 when rod 75 is lowered, thus interposing a positive insulating material between contacts 71 and 72 and breaking any arc which may tend to form therebetween. The mounting of insulating block 82 is such, however, that it is moved out of the path of electrode 72 when the latter is raised by lowering treadle 73.

The electrical connections may be made in any suitable way, and in all the figures we have designated the lead-in cables by the numerals 90 and 91. In Figs. 1–4 cable 90 is attached to a binding post 92 on yoke 29, and cable 91 is attached to a binding post 93 which may be part of a junction box if desired. The current is led from binding post 93 to contact 72 through a cable 94, from which it passes, when the treadle 73 is lowered, to contact 71, and thence to the electrodes 24, 25 and 26 through cable 95. When electrode 21, 22 or 23 is lowered the current passes from the corresponding electrode 24, 25 or 26 to the upper electrode through the glass to be perforated, and from the upper electrode to binding post 92 through yoke 29.

As indicated above, pieces of insulating material 12, 62, 82 and 76 are interposed where insulation is necessary, and these insulating materials may be of any suitable material although a preferred material has been indicated in connection with the description of each of these parts. Certain other parts, such as the spacing block 28, may be made of insulating material if desired.

With the connections made as indicated above, the operation of perforating the glass is effected as follows: The piece of glass 100, which it is desired to perforate, is heated to the desired temperature. This glass is then placed on the table 12, and pushed against stop 16 by holder 19, which is provided with a non-conducting handle 102, this holder being held in position by spring 17. The operator now lowers the corresponding handle 34, 35 or 36, according to which perforation he desires to form first, until the corresponding electrode contacts with the glass 100, electrodes 24, 25 and 26 being in contact with the opposite side of the glass. Treadle 73 is then lowered until contact 72 touches contact 71, thus completing the circuit. When the glass has been heated sufficiently to soften it, the proper handle 34, 35 or 36 is lowered to push the corresponding electrode 21, 22 or 23 through the glass and form the perforation, lever 58 at the same time being lowered to move electrodes 24, 25 and 26 out of the path of the descending electrode 21, 22 or 23. The knob of glass which is thereby forced out of the perforation is preferably severed from the main body of glass by the ejecting action of the electrode, and the handle 34, 35 or 36 is then raised.

Any resulting fin left around the perforation is allowed to cool, after which it can be ground off to leave a smooth surface or, if desired, this projecting fin may be fused down by the heat of the arc, although the latter method is subject to the disadvantage that it slightly closes the perforation and thickens up the glass in its vicinity. It is to be noted, however, that in the embodiment of our invention disclosed herein we have illustrated a die 15 below the point or points at which the perforation or perforations are to be made, said die being adapted to receive the electrode, and the use of such a die eliminates most of the fin.

To form additional perforations with the electrical connections arranged as indicated herein, this operation is repeated, using the remaining handles 34, 35 or 36 which were not used in forming the first perforation. Any desired number of pairs of electrodes may be utilized and they may be mounted in the yoke 29 in the desired alinement and at suitable distances apart to conform with the desired spacing of the perforations in the finished article. If only a small number of perforations are to be made it is unnecessary to reheat the glass between successive perforating operations, but in case a large number of perforations are desired, or in case the glass which is being perforated is of considerable thickness, it may be reheated to insure its being at the proper temperature. This reheating may be done in any suitable way, e. g., by electricity or by a burner playing directly on the glass, and without removing same from the table 12.

If desired, two or more perforations can be formed simultaneously by connecting each pair of electrodes in a different circuit, or by using sufficient voltage and connecting the paths of the electrodes in series.

Figure 5:
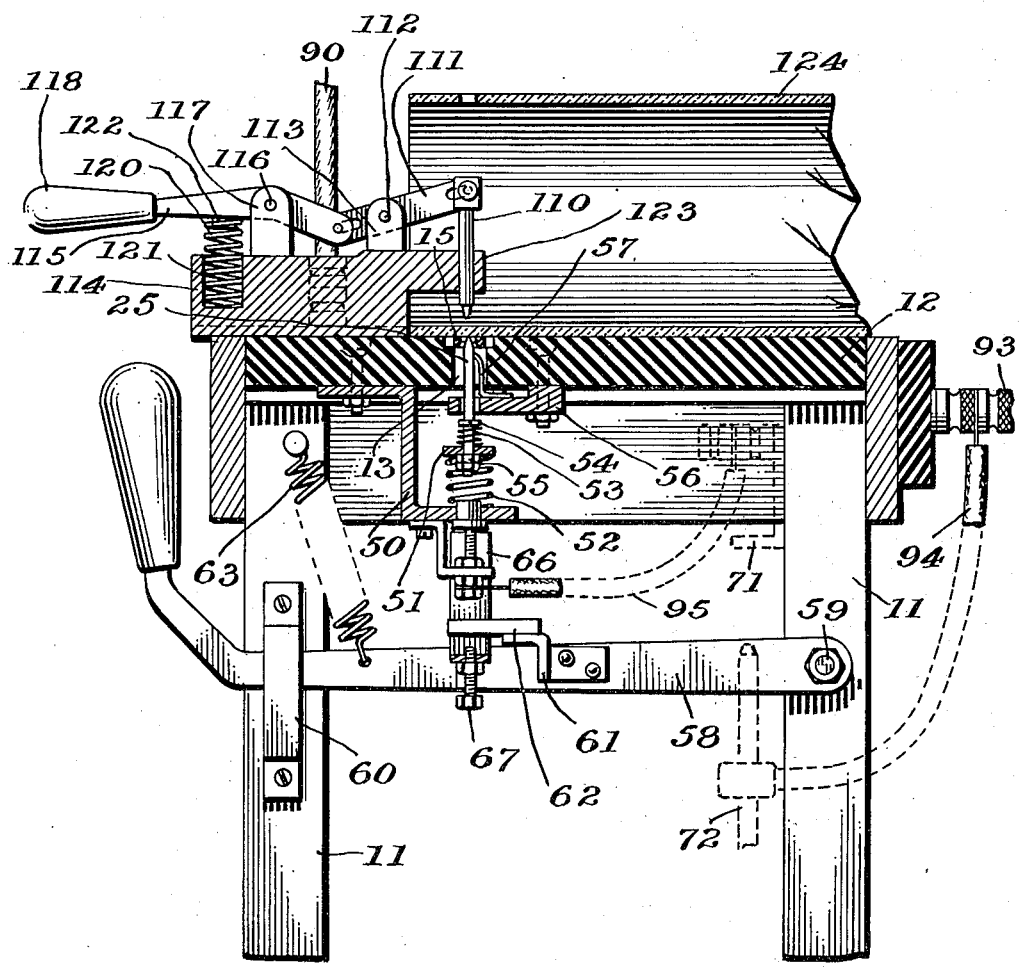
Fig. 5 is a vertical longitudinal section of a modification.

In Fig. 5 we have illustrated a modification of our invention which is particularly adapted for forming perforations in the walls of cylindrical or other partially enclosed articles. This apparatus is substantially like that illustrated in Figs. 1-4, differing therefrom only in the manner of mounting the upper electrode and of supporting the glass. As illustrated in this figure, the upper electrode 110 is supported by a link 111, pivoted at 112 to a bracket 113 which is carried by a metal block 114 secured to table 12. The opposite end of link 111 is pivoted to a bent lever 115, which in turn is pivoted at 116 to a bracket 117 also carried by block 114. Lever 115 has a handle 118 of suitable insulating material, and is normally held in a raised position which maintains the electrode 110 elevated, by means of a spring 120. This spring operates in a recess 121 in block 114, and its upper end surrounds a projection 122 on lever 115. Block 114 is provided with an overhanging projection 123 which serves to maintain the electrode in vertical alinement and also acts as a guide for the glass article 124 which is to be perforated. The operation of this apparatus is the same as that described above, the cylinder or other glass article 124 being pre-heated and inserted and held in the proper position, relative to electrode 110, with the aid of any suitable tongs (not shown). After the first perforation is made the article is moved to bring the point at which the next perforation is desired in alinement with the electrodes, and this operation is continued until the desired number of perforations have been made.

In Figs. 6 and 7 we have illustrated a method of forming perforations, such as strainer openings, in the bottom of a cylindrical member which is closed at one end. This apparatus differs from that illustrated in Figs. 1-4 by mounting the upper electrode 130 in a suitable guide 131, carried by a bracket 129 on table 12, and in mounting the article 132, which is to be perforated, in an adjustable guide 133, which facilitates moving the article with reference to the electrodes in order to form the perforations at the desired locations. Guide 131 may be of any desired construction, for example a slotted clamp, which may be tightened to secure the electrode in a predetermined position or unlocked to adjust the height of the electrode, by raising or lowering a handle 134 of suitable insulating material. Electrode 130 is provided with a similarly insulated handle 135 to permit it to be operated manually during the perforating operation. The operation of this apparatus is the same as that described above for Figs. 1-4, with the exception of the manual operation of electrode 130 and the adjustment of the article with reference to the electrodes. This adjustment is effected by sliding the guide 133 until it is in the position shown in Fig. 7, thus bringing the central portion of guide 133 in alinement with an opening 136 in a die 137 carried by table 12, and also in alinement with the electrodes. In this position the perforation would be formed in the center of article 132. The guide 133 would then be shifted to its other extreme position, determined by the engagement of bolts 138 with the opposite ends of slots 140 with which guide 133 is provided, thus locating the article so that the next perforation will be formed near the circumference of its bottom portion. To form successive perforations, in this circumferential portion, the guide is left in this position and the article turned by hand to align the desired location of these perforations with electrode 130 and die opening 136. The arrangement of die opening 136 and the guide 133 may be altered to form any desired arrangement of perforations, and electrode 130 may be operated mechanically instead of manually in various ways, for example by using a cam slot arrangement of the type illustrated in Figs. 1-4.

Figure 8:
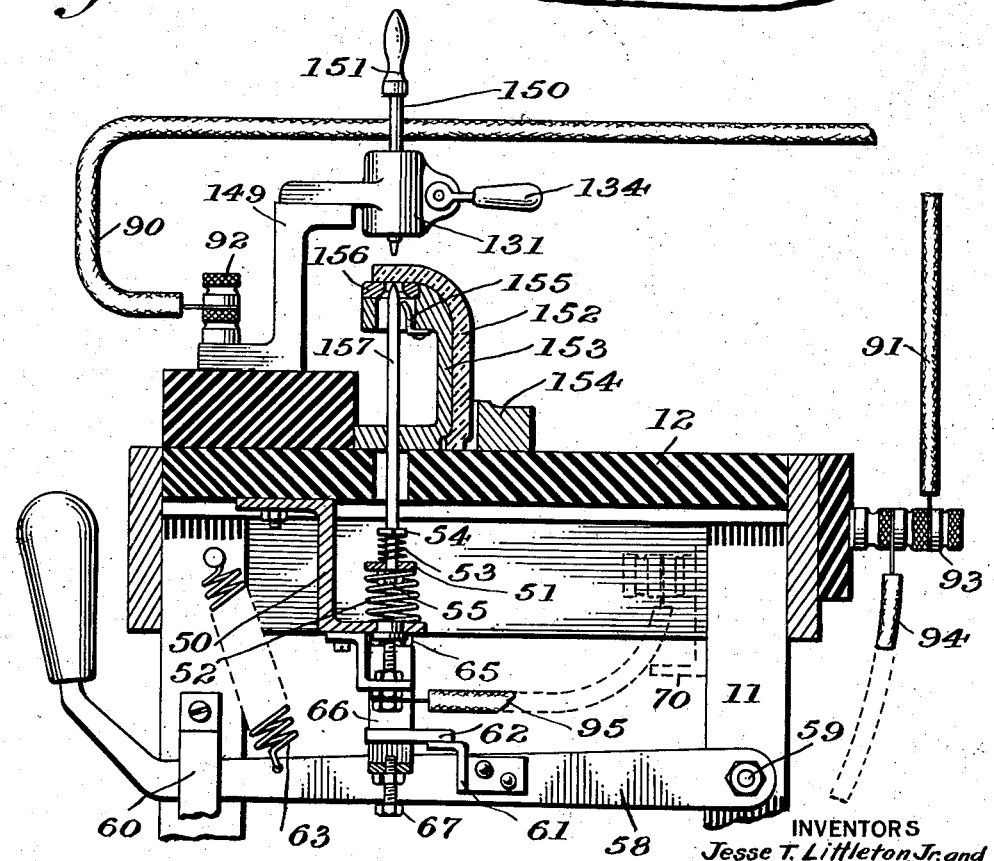
Fig. 8 is a vertical longitudinal section of another modification.

In Fig. 8 we have disclosed a further modification which is particularly adapted for perforating dental shields, this apparatus differing from that illustrated in Figs. 1-4 by the manner in which the article to be perforated is supported. In this modification the upper electrode 150, which has an insulated handle 151, is supported by a bracket 149 in the manner indicated in connection with electrode 130 in Fig. 6, but the shield or other article 152 to be perforated is inserted between fixed members 153 and 154 carried by table 12. Member 153 is a supporting bracket which, in addition to constituting a support for the article, carries a scraper 155 and a die 156, and member 154 is a block which is curved to conform to the shape of the article to be perforated. In this modification the lower electrode 157 is made longer than the lower electrodes described above to permit it to engage the under side of the article. The operation of this modified apparatus is the same as that shown in Figs. 1-4, except that only one pair of electrodes is utilized, and the upper electrode is raised and lowered directly, instead of through a cam slot, although the latter may be used if desired.

In each of the embodiments of our invention so far described the actual perforation is preferably made by pushing the electrode through the softened glass, hence the size and shape of the electrodes is chosen in accordance with the size and shape of perforation desired. Furthermore, by a suitable predetermined shaping of the electrodes, the ejected knobs of glass may be formed into various commercial shapes, such as beads.

Instead of forcing the electrode through the softened glass, however, the opening could be blown through it by using a hollow electrode and then directing air through the electrode to the point in the softened glass at which it is desired to form the perforation.

In practice, especially with relatively thick pieces of glass, and where relatively large perforations are being made, the electrodes are first placed in contact with the glass and, as the current starts to pass through the glass, one or more of the electrodes are separated from the glass, forming an arc or arcs thereto. This adds the heat of the arc to the ohmic resistance of the glass, and eliminates the chilling action of the electrodes and the tendency of the glass to stick to the latter.

Inasmuch as the perforating operation described herein is accompanied by the generation of a large amount of local heat, a high heat resistance glass facilitates the operation. Examples of glasses suitable for this purpose are disclosed in United States Letters Patent 1,304,623, granted May 27, 1919, to E. C. Sullivan and W. C. Taylor.

We have found that the perforating action is facilitated by preheating the glass to or above a critical point, above which it becomes an appreciable conductor of electricity. At this critical point the current increases with the application of a given voltage, consequently heating the glass. Below this point the current decreases as the glass cools. This preheating reduces the amount of heat which must be generated by the passage of the current through the glass, and permits the use of lower voltages since, at the higher temperature, the glass offers less resistance to the passage of the current, and therefore permits more current flow for a given voltage, and consequently a more rapid increase in temperature.

We have found that preheating the glass to between 400° and 500° C. gives satisfactory results when a potential of about 2300 volts A. C. is used to form a 3/16" perforation in a 1/8" thickness of glass of the composition set forth in the above mentioned patent. This voltage is the initial voltage but control inductances are set in the circuit so as to limit the current to not over 10 amperes. It will be obvious that the voltage, inductance and initial temperature may be varied over wide limits in forming perforations of varying sizes, in different thicknesses of glass, and in glasses of different compositions.

Preheating the glass also tends to decrease the breakage which would be likely to result during the process of annealing if the glass was merely heated in the vicinity of the perforation, since the latter heating would cause wide variations in temperature in different portions of the glass and would set up serious strains therein.

If the perforating operations are carried out immediately after the glass is shaped, and before it has a chance to cool, the reheating is of course unnecessary.

After the perforating operations are completed, the ware is given the usual annealing treatment to remove any strains which have been introduced in forming the perforations.

When glass is perforated in the manner indicated above a fused surface is left in the vicinity of the perforation which is stronger than when the perforation is ground through the glass. Furthermore, the perforations may be made more rapidly, with greater accuracy of location, and without any danger of breaking, chipping or weakening the surrounding glass.

We claim:—

1. The method of perforating glass which includes passing an electric current therethrough and melting the glass by the heat which results from the resistance of the glass to the passage of the current.

2. The method of perforating glass which includes the steps of preheating it and then fusing it by the passage of an electric current therethrough.

3. The method of perforating glass which includes the steps of fusing the glass in the vicinity of the desired perforation by the use of an electric current, and ejecting a desired amount of the fused glass.

4. The method of perforating glass which includes the steps of fusing the glass in the vicinity of the desired perforation by the use of an electric current, and ejecting an amount of the fused glass corresponding to the size of perforation desired.

5. The method of perforating glass which includes the steps of placing electrodes on either sides of the glass at the point where it is desired to form the perforation, passing a current from one electrode to the other, to fuse the glass by the heat generated in the glass by the current, and forcing an electrode through the fused glass.

6. The method of perforating glass which comprises heating it until it becomes an electric conductor, passing an electric current through it at the point where it is desired to form the perforation until the intervening glass is fused by the heat of the current, and pushing an electrode through the fused glass.

7. The method of perforating glass which comprises heating it until it becomes a conductor of electricity, placing electrodes on either side of the glass at the point where it is desired to form the perforation, placing the electrodes in contact with the glass, passing a current from one electrode to the other, drawing the electrodes slightly apart and maintaining them in this position until the glass is fused, and forcing one of the electrodes through the fused glass.

8. The method of perforating glass which comprises preheating it, passing an electric current through it until the glass is fused, forcing out a portion of the fused glass, and removing the resulting projecting portion of glass.

9. The method of perforating glass which comprises pre-heating it, fusing a predetermined portion by the passage of an electric current therethrough, ejecting a portion of the fused glass, and annealing the glass to remove any strains caused by the perforating operation.

10. The method of perforating glass which comprises pre-heating it, fusing a predetermined portion by the passage of an electric current therethrough, ejecting a portion of the fused glass, removing the ejected portion, and annealing the glass to remove any strains caused by the perforating operation.

11. An apparatus for perforating glass, comprising a table to support the glass, a pair of movable electrodes, means for passing a current through the glass to soften it, and means for forcing one of the electrodes through the softened glass.

12. An apparatus for perforating glass, comprising a table to support the glass, an electrode mounted above the glass, a second electrode mounted below the glass, means for moving the electrodes into contact with the glass, means for causing an electric current to pass therethrough, and means for forcing one of the electrodes through the glass.

13. An apparatus for perforating glass, comprising a table to support the glass, a series of electrodes, means for supporting one electrode above the glass, means for supporting another electrode below the glass, means for independently moving both electrodes with reference to the glass, and a switch to control the passage of the current between the electrodes.

14. An apparatus for perforating glass, comprising a glass supporting means, a die carried thereby and provided with an opening of the size of the perforation which it is desired to form in the glass, an electrode above the glass, an electrode below the glass, and means for forcing one of the electrodes through the glass and into the die.

15. An apparatus for perforating glass, comprising a glass supporting means, a die carried thereby and provided with an opening of the size of the perforation which it is desired to form in the glass, an electrode above the glass, an electrode below the glass, and means for forcing the electrode into the die.

16. An apparatus for perforating glass, comprising a support for the glass, a pair of electrodes on opposite sides of the glass, means for normally holding one of the electrodes out of contact with the glass, and means for moving the other electrode out of contact with the glass.

17. An apparatus for perforating glass, comprising a support for the glass, a pair of electrodes on opposite sides of the glass, means for normally holding one of the electrodes out of contact with the glass, means for moving said electrode into contact with the glass, means for moving the other electrode out of contact with the glass, and means for then forcing the first mentioned electrode through the glass.

18. An apparatus for perforating glass, comprising a support for the glass, a pair of electrodes on opposite sides of the glass, means for normally holding one of the electrodes out of contact with the glass, means for moving said electrode into contact with the glass and then forcing it through the glass to form the desired perforation, and a scraper for removing adhering glass from the other electrodes.

19. An apparatus for perforating glass, comprising a table to support the glass, means for holding the glass in a predetermined position on the table, a pair of movable electrodes, means for passing a current through the glass to soften it, and means for forcing one of the electrodes through the softened glass.

20. An apparatus for perforating glass, comprising a table to support the glass, a series of electrodes mounted above the glass, a corresponding series of electrodes mounted below the glass, and means for independently moving the electrodes with reference to the glass to permit the passage of an electric current between predetermined pairs of electrodes, whereby the glass may be perforated with a predetermined series of holes without changing its position.

21. The method of perforating glass which comprises bringing a conductive punch element into contact with the glass, locally heating and softening the glass by electric current applied thereto through the element and pressing the conductive punch element into the locally heated glass.

JESSE T. LITTLETON, Jr.
CARLTON R. SMITH.